United States Patent
Fish et al.

(10) Patent No.: US 7,320,212 B2
(45) Date of Patent: Jan. 22, 2008

(54) SIDE-FED SHIELDED INTERNAL FUEL MANIFOLD INLET TUBE

(75) Inventors: Jason Araan Fish, Brampton (CA); Bryan Olver, Nobleton (CA); Vittorio Bruno, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 814 days.

(21) Appl. No.: 10/764,578

(22) Filed: Jan. 27, 2004

(65) Prior Publication Data

US 2005/0160738 A1   Jul. 28, 2005

(51) Int. Cl.
 *F02C 7/22* (2006.01)
(52) U.S. Cl. .................... 60/39.094; 60/739
(58) Field of Classification Search ............. 60/39.094, 60/734, 739, 740
See application file for complete search history.

(56) References Cited

U.S. PATENT DOCUMENTS

| | | | |
|---|---|---|---|
| 3,879,940 A | 4/1975 | Stenger et al. | |
| 4,185,462 A | 1/1980 | Morse, II et al. | |
| 4,467,610 A | 8/1984 | Pearson et al. | |
| 5,076,242 A | 12/1991 | Parker | |
| 5,259,185 A | 11/1993 | Peterson | |
| 5,261,240 A | 11/1993 | Oyler et al. | |
| 5,263,314 A * | 11/1993 | Anderson | 60/739 |
| 5,279,112 A | 1/1994 | Halila | |
| 5,771,696 A * | 6/1998 | Hansel et al. | 60/739 |
| 6,354,085 B1 | 3/2002 | Howell et al. | |
| 2005/0039457 A1* | 2/2005 | Moraes | 60/739 |

* cited by examiner

*Primary Examiner*—L. J. Casaregola
(74) *Attorney, Agent, or Firm*—Ogilvy Renault LLP

(57) ABSTRACT

In a gas turbine engine, a fuel inlet tube comprising a body, a channel defined in the body and in fluid communication with a manifold, and a side inlet in fluid communication with the channel, such that fuel entering the side inlet is delivered to the manifold through the channel with a pressure generally directed along a radial axis of the body. Also, a fuel inlet tube comprising a heat shield surrounding at least part of a body, a chamber defined between the heat shield and the body and in fluid communication with fuel leak sources, a drain channel defined in the body in fluid communication with the chamber, and a drain hole defined in the body in fluid communication with the drain channel, such that a leak produces fuel received in the chamber and safely directed through the channel and the hole to allow detection of the leak.

12 Claims, 3 Drawing Sheets

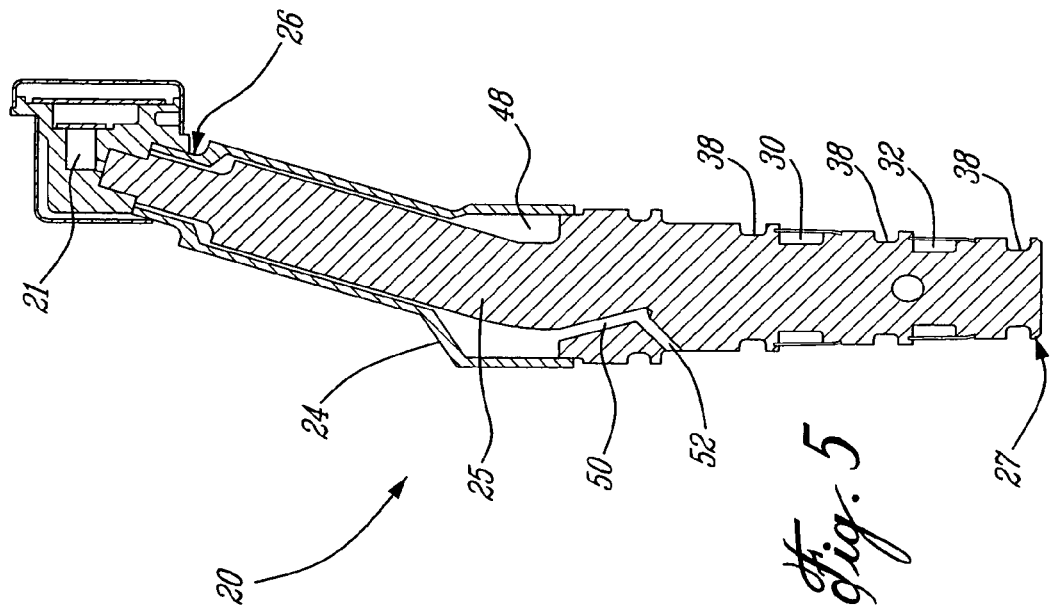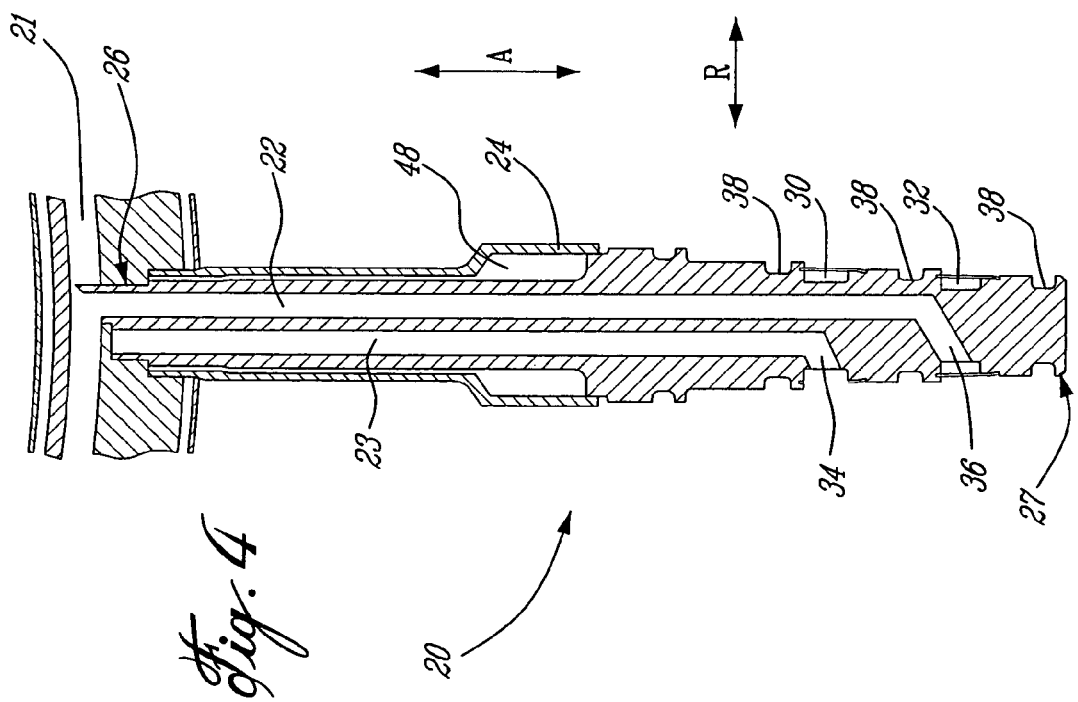

SIDE-FED SHIELDED INTERNAL FUEL MANIFOLD INLET TUBE

BACKGROUND OF THE INVENTION

1. Field of the Invention

The present invention relates to gas turbine engines, and most particularly to fuel distribution to combustors of such engines.

2. Background Art

In a gas turbine engine, fuel is generally supplied to a combustor through a plurality of fuel nozzles in fluid communication with a fuel manifold. The fuel manifold receives fuel from one or more fuel inlet tubes.

Known inlet tubes generally have a single channel or two concentric channels, and the fuel is fed axially in each channel. The pressure of the axially fed fuel creates a considerable force along the axial direction of the tube which acts on the fuel manifold. This force is transferred to the support structure of the manifold, as well as the joints between the inlet tubes and the manifold, which can lead to a premature rupture thereof.

Since the combustor operates at high temperatures, engine fuel system components must be adequately protected against heat damage. Heat shields are often provided on the inlet tubes for such protection. However, heat shields can represent a significant weight increase for the fuel system.

Because of these high temperatures, a fuel leak could result in a fire. Thus, it is desirable that the fuel system be leak proof, and include a safe way to dispose of leaked fuel should a leak occur. A double walled construction is often used on inlet tubes and other conduits in order to provide an annular passageway for leaked fuel. Such a construction can also significantly increase the weight of the fuel system.

Accordingly, there is a need for a heat shielded fuel inlet tube that can provide for adequate disposition of leaked fuel while having a minimal weight.

There is also a need for a fuel inlet tube that can reduce the force transmitted along the axial direction of the tube to the manifold by fuel pressure.

SUMMARY OF INVENTION

It is therefore an aim of the present invention to provide an improved fuel inlet conduit.

Therefore, in accordance with the present invention, there is provided an inlet tube for supplying fuel to a manifold of a combustor in a gas turbine engine, the inlet tube comprising a tube body, a longitudinal primary channel defined in the tube body, the primary channel having first and second ends, the second end being in fluid communication with the manifold, and a side inlet defined in an outer surface of the tube body and being in fluid communication with the first end of the primary channel, such that fuel entering the side inlet is delivered in the primary channel with a fuel pressure being generally directed along a radial axis of the tube body, whereby the fuel enters the side inlet and travels through the primary channel to the manifold.

Also in accordance with the present invention, there is provided an inlet tube for supplying fuel to a manifold of a combustor in a gas turbine engine, the inlet tube comprising a tube body, a heat shield surrounding at least part of the tube body such as to protect the at least part of the tube body from heat damage, a chamber defined by a free space between the heat shield and the tube body, the chamber being in fluid communication with potential fuel leak sources in the tube body, a drain channel defined in the tube body and having first and second ends, the first end being in fluid communication with the chamber such that any liquid contained in the chamber is directed in the drain channel, and a drain hole defined in an outer surface of the tube body remote from the at least part of the tube body surrounded by the heat shield and in fluid communication with the second end of the drain channel, such that any liquid contained in the drain channel is directed out of the tube body through the drain hole, whereby a fuel leak from any of the potential leak sources produces fuel which is received in the chamber and directed out of the tube body through the drain channel and the drain hole, such that the fuel coming out of the drain hole is safely disposed of and easily noticeable to allow detection of the leak.

Further in accordance with the present invention, there is provided a method for feeding fuel to a manifold of a combustor in a gas turbine engine, the method comprising the steps of providing a fuel inlet tube defining a primary channel in fluid communication with the manifold, and feeding fuel under pressure in the primary channel through a side inlet defined in an outer surface of the fuel inlet tube in order to generally direct a pressure force produced by the fuel along a radial axis of the fuel inlet tube.

Further in accordance with the present invention, there is also provided a method for detecting a leak in an inlet tube supplying fuel to a manifold in a gas turbine engine, the method comprising the steps of providing a heat shield surrounding at least part of the inlet tube so as to protect the at least part of the inlet tube from heat, a free space between the heat shield and the inlet tube forming a chamber in fluid communication with a leak source, receiving fuel coming from the leak source in the chamber, directing the fuel from the chamber out of the inlet tube through a drain channel defining a drain hole in an outer surface of the inlet tube, and detecting the fuel coming out of the drain hole.

Further yet in accordance with the present invention, there is provided an inlet tube for supplying fuel to a manifold of a combustor in a gas turbine engine, the inlet tube comprising a tube body, channel means defined in the tube body, the channel means being in fluid communication with the manifold, and side inlet means defined in an outer surface of the tube body and in fluid communication with the channel means, such that fuel entering the side inlet means is delivered to the channel means with a fuel pressure generally directed along a radial axis of the tube body, whereby the fuel enters the side inlet means and travels through the channel means to the manifold.

Further yet in accordance with the present invention, there is also provided an inlet tube for supplying fuel to a manifold of a combustor in a gas turbine engine, the inlet tube comprising a tube body, heat protecting means surrounding at least part of the tube body, a chamber defined by a free space between the heat protecting means and the tube body, the chamber being in fluid communication with potential fuel leak sources in the tube body, and drain means in fluid communication with the chamber such that any liquid contained in the chamber is directed out of the tube body through the drain means, whereby a fuel leak from any of the potential leak sources produces fuel which is received in the chamber and directed out of the tube body through the drain means, such that the fuel coming out of the drain means is safely disposed of and easily noticeable to allow detection of the leak.

BRIEF DESCRIPTION OF THE DRAWINGS

Having thus generally described the nature of the invention, reference will now be made to the accompanying drawings, showing by way of illustration a preferred embodiment thereof and in which:

FIG. 4 is a front view, in cross-section, of the fuel inlet tube of FIG. 2 connected to a fuel manifold; and FIG. 5 is a side view, in cross-section, of the fuel inlet tube and fuel manifold of FIG. 4.

DESCRIPTION OF THE PREFERRED EMBODIMENTS

Figure 1:
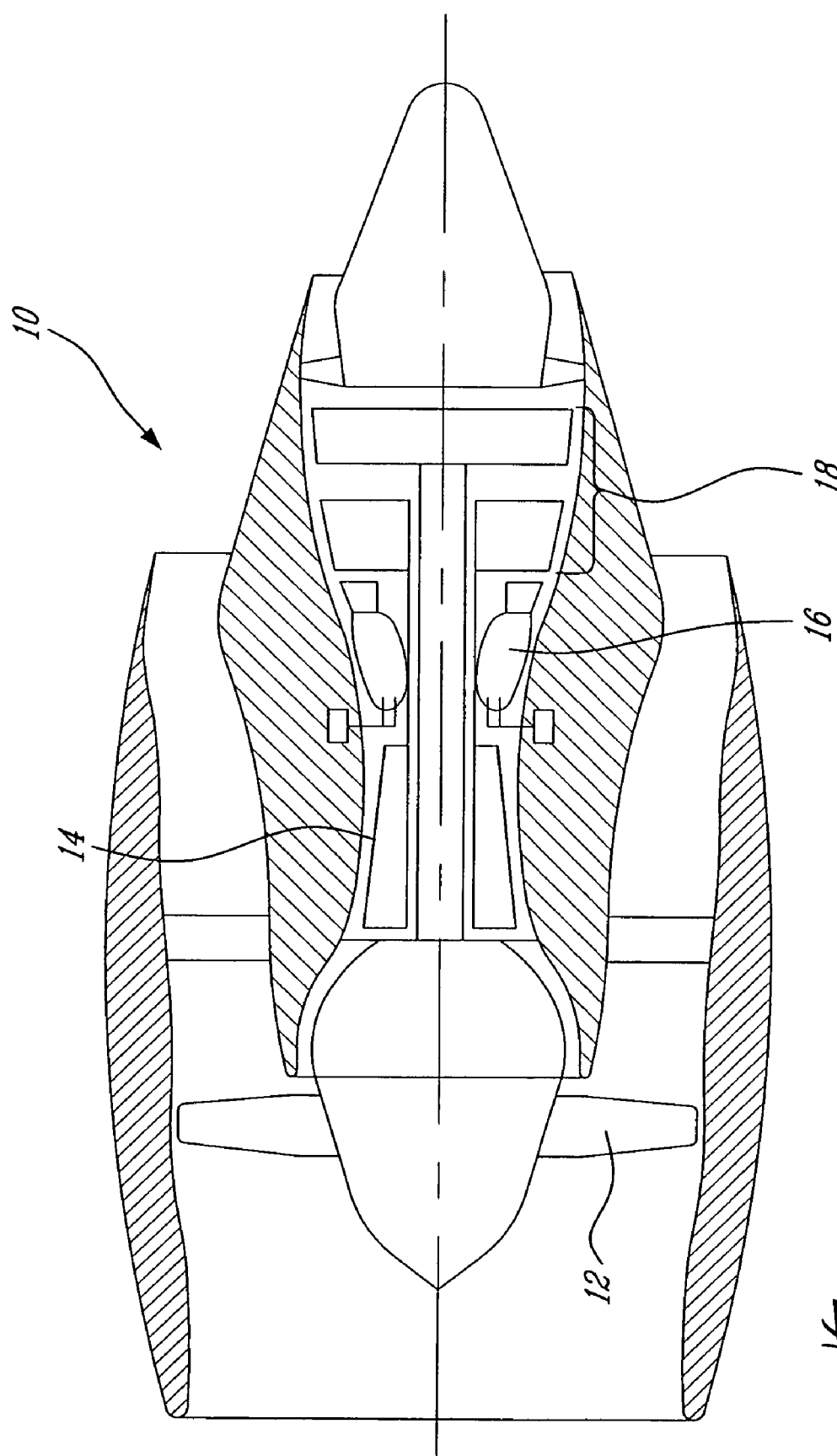
FIG. 1 is a side view of a gas turbine engine, in partial cross-section, exemplary of an embodiment of the present invention.
Figure 3:
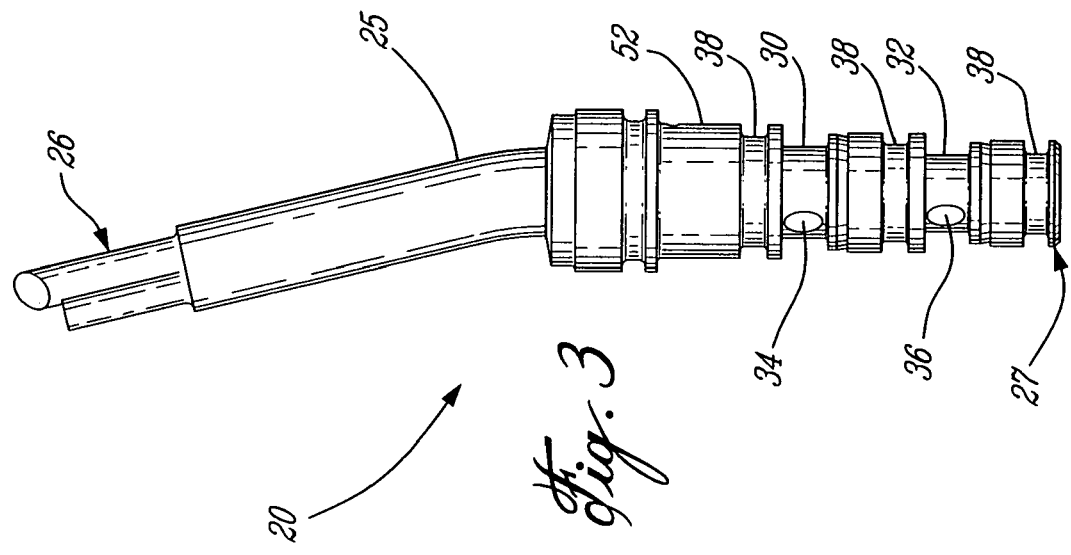
FIG. 3 is a side view of the fuel inlet tube of FIG. 2 with the heat shield removed.
Figure 2:
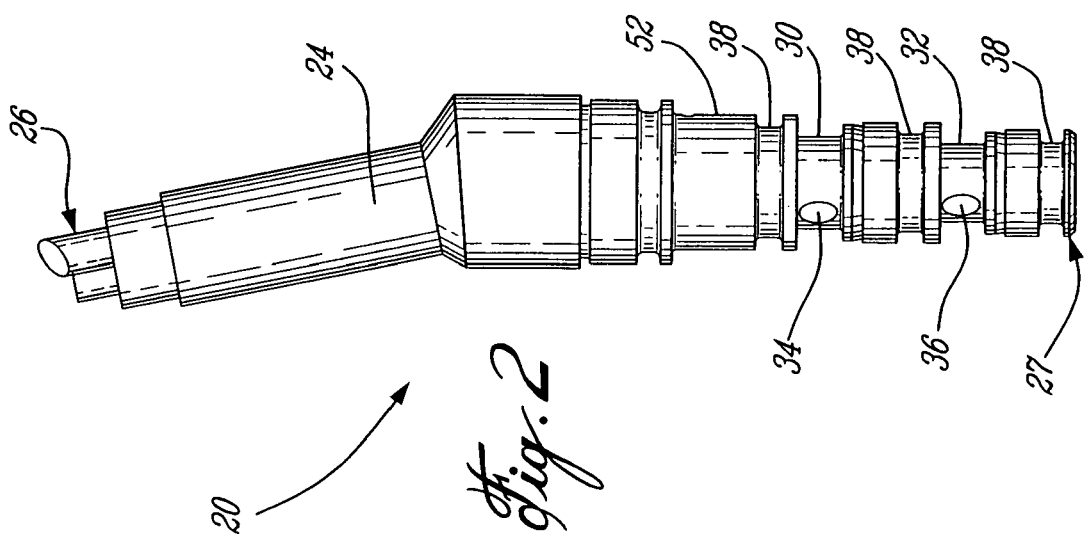
FIG. 2 is a side view of a fuel inlet tube equipped with a heat shield, exemplary of a preferred embodiment of the present invention.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Referring to FIGS. 4-5, a fuel inlet tube generally indicated at 20 has a distal end 26 and a proximal end 27. The distal end 26 is connected to a fuel manifold 21 which usually surrounds the combustor 16 and delivers fuel to a plurality of fuel nozzles located within the combustor. The inlet tube 20 preferably comprises a primary channel 22 and a secondary channel 23, both channels being axially defined in the tube and being located side by side. In the present text, the terms "axial" and "radial" are defined relative to the inlet tube 20 and correspond, respectively, to the directions indicated by arrows A and R in FIG. 4. The channels 22,23 are in fluid communication with the manifold 21. The inlet tube 20 is covered by a heat shield 24 at the distal end 26, the heat shield 24 being in contact with the manifold 21 in order to protect the inlet tube 20 against heat damage. The inlet tube 20 can include a bend 25, which is defined along an axis perpendicular to a plane including the axes of both channels 22,23, in order to compensate for an offset between the fuel manifold and the fuel source without compromising a fuel flow in the channels 22,23. Such a bend eliminates the need for a multi-piece assembly and thus reduces the need for weld or braze during assembly.

Referring to FIGS. 2 to 5, two circumferential grooves 30,32 are defined in the inlet tube 20 near the proximal end 27. Into the upper circumferential groove 30 is defined a first side feed inlet 34 which is in fluid communication with the secondary channel 23. Similarly, a second side feed inlet 36 is defined in the lower circumferential groove 32 and is in fluid communication with the primary channel 22. When the tube 20 is installed in the engine casing, a mating part (not shown) will close the grooves 30,32, thereby forming circumferential channels. Sealing the two grooves 30,32 are a series of o-rings (not shown) seated in grooves 38.

Referring to FIGS. 4-5, a free space between the heat shield 24 and the tube 20 defines a chamber 48. The chamber 48 is adapted to receive fuel which might leak from the joint between the inlet tube 20 and the manifold 21. A drain channel 50 is provided in the inlet tube 20 and is in fluid communication with the chamber 48. The drain channel 50 reaches the outer surface of the inlet tube 20, defining therein a drain hole 52. The chamber 48, drain channel 50 and drain hole 52 form a drain system effectively directing leaked fuel along a determined leak path directing the fuel overboard.

In operation, fuel is injected in the grooves 30,32 and enters the channels 22,23 through the side feed inlets 34,36. The side feed inlets 34,36 allow the pressure of the injected fuel to be generally directed in a radial direction, thereby reducing the axial force produced by the fuel pressure. This reduces the axial force acting on the manifold 21. The fuel then travels through the channels 22,23 and enters the manifold 21 to be delivered to fuel nozzles.

If a leak happens at the joint between the inlet tube 20 and the manifold 21, the leaked fuel is received in the chamber 48. The leaked fuel is then evacuated overboard through the drain channel 50 and drain hole 52, where it is safely disposed of and can be easily noticed. The drain system therefore provides for ready leak detection without the need to disassemble the inlet tube 20.

The inlet tube 20 is preferably manufactured by turning, then drilling of the channels, and finally bending of the tube if required.

The present invention therefore provides for a reduction of the axial force reacting on the manifold, thus reducing the wear of the manifold and its supporting means which increases their useful life. The present invention also provides for a heat shield that ensures protection from heat damage as well as fuel leakage control, combining two functions in one component and thus reducing the weight of the fuel inlet tube.

Although a preferred embodiment of the invention includes both primary and secondary channels 22,23, it is also contemplated to provide an inlet tube 20 having a single channel with a side feed inlet, or any other number of similar channels.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

We claim:

1. An inlet tube for supplying fuel to a manifold of a combustor in a gas turbine engine, the inlet tube comprising:
   a tube body;
   a longitudinal primary channel defined in the tube body, the primary channel having first and second ends, the second end being in fluid communication with the manifold; and
   a side inlet defined in an outer surface of the tube body and being in fluid communication with the first end of the primary channel, the side inlet communicating with a circumferential groove defined in the outer surface of the tube body, such that fuel entering the side inlet is delivered in the primary channel with a fuel pressure being generally directed along a radial axis of the tube body;
   whereby the fuel enters the side inlet and travels through the primary channel to the manifold.

2. The inlet tube according to claim 1, wherein the tube body also defines a longitudinal secondary channel, the secondary channel being in fluid communication with the manifold and being side-by-side with the primary channel, and a second side inlet is defined in the outer surface of the tube body, the second side inlet being in fluid communication with the secondary channel.

3. The inlet tube according to claim 2, wherein the tube body is bent along an axis perpendicular to a plane containing the axes of the primary and secondary channels.

4. An inlet tube for supplying fuel to a manifold of a combustor in a gas turbine engine, the inlet tube comprising:
   an tube body;
   a heat shield surrounding at least part of the tube body such as to protect the at least part of the tube body from heat damage;
   a chamber defined by a free space between the heat shield and the tube body, the chamber being in fluid communication with potential fuel leak sources in the tube body;
   a drain channel defined in the tube body and having first and second ends, the first end being in fluid communication with the chamber such that any liquid contained in the chamber is directed in the drain channel; and
   a drain hole defined in an outer surface of the tube body remote from the at least part of the tube body surrounded by the heat shield and in fluid communication with the second end of the drain channel, such that any liquid contained in the drain channel is directed out of the tube body through the drain hole;
   whereby a fuel leak from any of the potential leak sources produces fuel which is received in the chamber and directed out of the tube body through the drain channel and the drain hole, such that the fuel coming out of the drain hole is safely disposed of and easily noticeable to allow detection of the leak.

5. The inlet tube according to claim 4, further comprising:
   a longitudinal primary channel defined in the tube body and being in fluid communication with the manifold and in fluid communication with at least one of the potential leak sources;
   a side inlet defined in an outer surface of the tube body and being in fluid communication with the primary channel, such that fuel entering the side inlet is delivered to the manifold through the primary channel with a fuel pressure being generally directed along a radial axis of the tube body.

6. The inlet tube according to claim 5. further comprising a longitudinal secondary channel defined in the tube body, the secondary channel being in fluid communication with the manifold and being side-by-side with the primary channel, and a second side inlet defined in the outer surface of the tube body, the second side inlet being in fluid communication with the secondary channel.

7. The inlet tube according to claim 4, wherein a part of the tube body located in the chamber is bent.

8. An inlet tube for supplying fuel to a manifold of a combustor in a gas turbine engine, the inlet tube comprising:
   a tube body;
   channel means defined in the tube body, the channel means being in fluid communication with the manifold;
   side inlet means defined in an outer surface of the tube body and in fluid communication with the channel means, the side inlet means communicating with a circumferential groove defined in the outer surface of the tube body, such that fuel entering the side inlet means is delivered to the channel means with a fuel pressure generally directed along a radial axis of the tube body;
   whereby the fuel enters the side inlet means and travels through the channel means to the manifold.

9. The inlet tube according to claim 8, wherein the tube body is bent along an axis perpendicular to a plane containing the axes of the channel means.

10. An inlet tube for supplying fuel to a manifold of a combustor in a gas turbine engine, the inlet tube comprising:
    a tube body;
    heat protecting means surrounding at least part of the tube body;
    a chamber defined by a free space between the heat protecting means and the tube body, the chamber being in fluid communication with potential fuel leak sources in the tube body;
    drain means in fluid communication with the chamber such that any liquid contained in the chamber is directed out of the tube body through the drain means;
    whereby a fuel leak from any of the potential leak sources produces fuel which is received in the chamber and directed out of the tube body through the drain means, such that the fuel coming out of the drain means as safely disposed of and easily noticeable to allow detection of the leak.

11. The inlet tube according to claim 10, further comprising:
    channel means defined in the tube body, the channel means being in fluid communication with the manifold;
    side inlet means defined in an outer surface of the tube body and in fluid communication with the channel means, such that fuel entering the side inlet means is delivered to the manifold through the channel means with a fuel pressure generally directed along a radial axis of the tube body.

12. The inlet tube according to claim 11, wherein a part of the tube body located in the chamber is bent along an axis perpendicular to a plane containing the axes of the channel means.

* * * * *